July 27, 1948.　　　L. H. BLANCHARD　　　2,446,041

PLASTIC MOLDING PRESS

Filed Sept. 6, 1945

INVENTOR.
LLOYD H. BLANCHARD
BY
Charles R. Fay
atty.

Patented July 27, 1948

2,446,041

UNITED STATES PATENT OFFICE 2,446,041

PLASTIC MOLDING PRESS

Lloyd H. Blanchard, Worcester, Mass.

Application September 6, 1945, Serial No. 614,652

2 Claims. (Cl. 18—17)

This invention relates to a press for molding heated plastic material to the shape desired by means of a die.

Objects of the invention include the provision of a base, a standard thereon, and a swinging bracket on the standard, said bracket carrying a source of heat and angularly located with respect thereto the bracket carries a plunger, said plunger mounting at its lower end a heated unit carrying deformable material, the base being adapted to support a die and the thermoplastic material to be molded thereto, whereby the latter may be easily heated until the same is in a plastic or a semi-plastic moldable condition, whereupon the bracket may be swung to bring the plunger and its heated deformable material over the plastic, so that the plunger may be depressed in a simple manner to press the plastic material to the die, the base being the equivalent of an anvil and the plunger and heated deformable material being the equivalent of a press, whereby thermoplastic molding may be easily and simply accomplished without the necessity for technical skill on the part of the operator.

Other objects and advantages of the invention will appear hereinafter.

Reference is to be had to the accompanying drawings, in which

Figure 1:
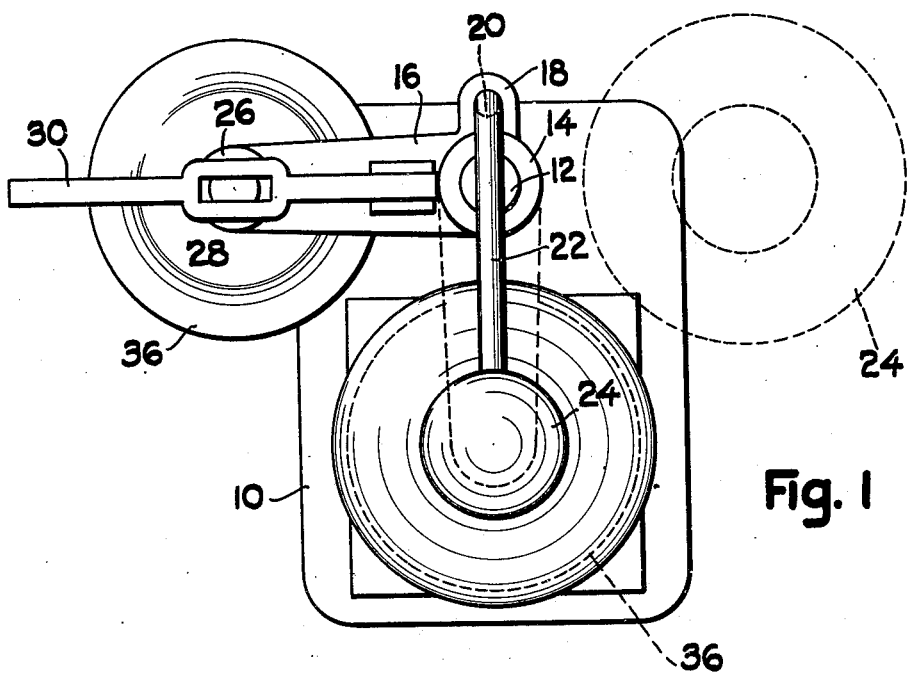
Fig. 1 is a top plan view of the invention.
Figure 2:
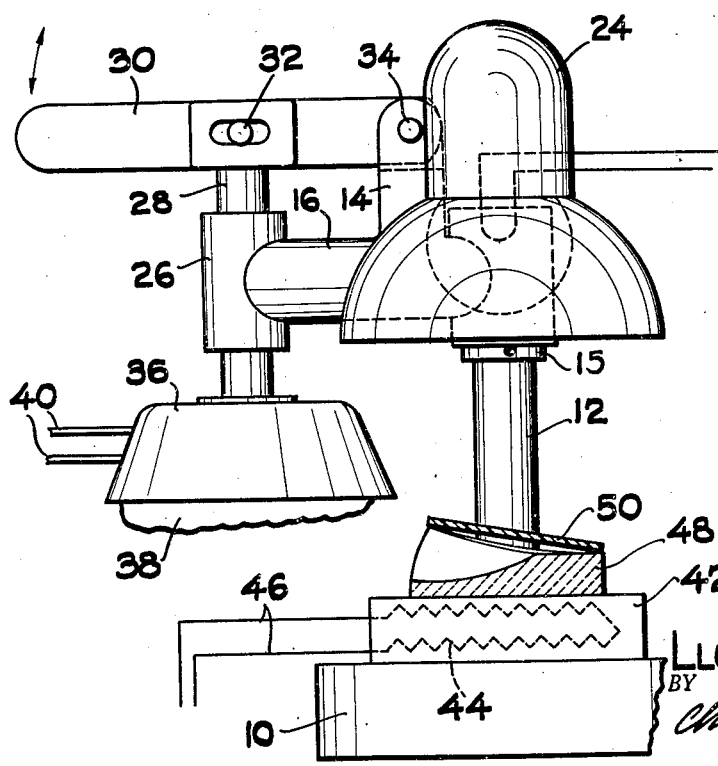
Fig. 2 is a view in side elevation of the same.

There is provided a base 10 which is adapted to rest on a table or bench and forming a support for the entire device. Rising from base 10 there is a vertical standard 12 mounting a swingable bracket thereon, bracket 14 swinging on the standard as an axis. Any suitable means such as a washer or the like 15 may be used to adjustably secure the bracket in desired elevation. The bracket 14 is provided with a long arm 16 and a short arm 18. The short arm 18 carries rod 20 therein which is vertically adjustable with respect thereto and rod 20 carries on horizontal portion 22 thereof a lamp housing 24 or other heating means. It will be clear that the entire lamp 24 will swing in a horizontal plane as the bracket 14 is swung on the standard 12.

The long arm 16 of the bracket is provided with a vertical bushing 26 slidably carrying a vertically moving plunger 28 therein. At its upper end the plunger is connected to a lever 30, as by a lost motion connection 32. The lever 30 is pivoted to bracket 14 on a pin 34 to swing in a vertical plane thereon.

At its lower end, plunger 28 has an inverted cup or carrier 36 secured thereto and this cup is adapted to be filled with a deformable material as at 38, said material taking the form of clay or a pneumatic or hydraulic flexible shoe. The cup and its contents may be heated by steam or hot water circulating in pipes 40.

The base 10 carries a block 42 which may be fixed or detachable and this block is adapted to be heated by an electric element 44 connected to a source of power thru wires 46.

In the operation of the device, a die or mold 48 is placed on block 42 so that the latter will heat the former from the bottom. A sheet of thermoplastic material 50 is placed on the die 48 receiving heat transmitted thereby, and at the same time the source of heat 24 above the base will heat the thermoplastic material from the top. When the material 50 becomes plastic enough to mold, the lever 30 is grasped and swung in a counterclockwise direction, as seen in Fig. 1, so that the cup 36 assumes the dotted line position as shown, and the lamp 24 is similarly and simultaneously moved as also shown in Fig. 1 in dotted lines. Handle 30 is then depressed, moving the plunger down and forcing the deformable material 38 into pressing contact with the material 50, the contents of the cup having been heated as above described. Hence, plastic material 50 is preheated before molding and the heating continues during the molding process. The result is that the plastic material 50 is made to conform to the die 48 in a simple and easy manner not requiring technical ability on the part of the operator.

This invention is particularly adapted to fine work such as forming prosthetic dental plates, etc., from the plastic 50 but other uses for the press are contemplated.

Having thus described my invention and the advantages thereof, I do not wish to be limited to the details herein disclosed, otherwise than as set forth in the claims, but what I claim is:

1. A molding press comprising a base, a standard, a bracket swingable on the standard parallel to the base, a source of heat and a plunger on the bracket to swing therewith for selective positioning of either the heat source or the plunger in operative relation to the base, a carrier on the lower end of the plunger, means to operate the plunger to approach the base, deformable material in the carrier, said base being adapted to support a mold for pre-heating by the heat source.

2. The press of claim 1 wherein said plunger operating means comprises a lever pivoted to the bracket and plunger for swinging the former and depressing the latter.

LLOYD H. BLANCHARD.

REFERENCES CITED

The following references are of record in the file of this patent:

UNITED STATES PATENTS

| Number | Name | Date |
|---|---|---|
| 1,533,452 | Paulen | Apr. 14, 1925 |
| 2,298,037 | Crandell | Oct. 6, 1942 |
| 2,329,425 | Steel | Sept. 14, 1943 |
| 2,353,996 | Cooke et al | July 18, 1944 |
| 2,367,779 | Hull | Jan. 23, 1945 |